United States Patent [19]

Warszawski

[11] Patent Number: 4,596,722
[45] Date of Patent: Jun. 24, 1986

[54] ELECTROSENSITIVE MEDIA AND RECORDING PROCESS

[75] Inventor: Bernard Warszawski, Paris, France

[73] Assignee: Hopkinson Associates Inc., New York, N.Y.

[21] Appl. No.: 769,173

[22] Filed: Aug. 26, 1985

Related U.S. Application Data

[62] Division of Ser. No. 370,475, Apr. 21, 1982, Pat. No. 4,538,158.

[51] Int. Cl.$^4$ .............................................. B05D 5/12
[52] U.S. Cl. .................................... 427/108; 350/357
[58] Field of Search ........................ 427/108; 350/357

[56] References Cited

U.S. PATENT DOCUMENTS 4,233,339  11/1980  Leibowitz et al. .................. 427/108

Primary Examiner—James J. Bell
Attorney, Agent, or Firm—Kane, Dalsimer, Kane, Sullivan and Kurucz

[57] ABSTRACT

A process for manufacturing electrochromic recording materials, useful for recording signals and images, is carried out by coating a suitable substrate with a homogeneous fluid mixture of a hydrosoluble salt of a metal cathodically depositable from an aqueous solution of its ions and an initially hydrosoluble film-forming polymer resin, in water. The recording mediums of the invention are advantageous for generating images whose background and marks remain unaffected by light, heat and humidity.

8 Claims, No Drawings

ELECTROSENSITIVE MEDIA AND RECORDING PROCESS

This is a division of application Ser. No. 370,475, filed April 21, 1982 now U.S. Pat. No. 4,538,158.

BACKGROUND OF THE INVENTION

1. Field of the Invention

This invention relates to new products and processes for the non-impact recording of visible signals and images and applies in particular to the printing of alphanumerical and graphical signals produced by computers, measurement devices, etc., to recording and hard-copy print-out of images and data such as displayed on video terminals, to facsimile and telecopy transmission of documents and images.

2. Brief Description of the Prior Art

A large number of non-impact recording processes are known: photographical, electrostatic, thermal, laser, sparking, electrolytic, etc., which use different physical and chemical processes to produce visible marks on a recording material.

Among the known processes are those which use the flow of electrical current through the recording medium to produce marks. These processes are of special interest since they fit most easily to electronic means and use the simplest writing or printing heads. Using one or more conductive styli they offer significant advantages from the point of view of simplicity, cost, size and reliability of the recording device.

One can distinguish two principal kinds of processes using the flow of electric current through the recording medium.

The first kind are called the indirect or development processes, in which the current flow is used to create a latent image or low density image which must eventually be revealed or developed through a thermal, chemical or physical process. Such processes using thermal development are described in the French Pat. No. 2,280,517, in the British Pat. No. 1,275,929, and in the U.S. Pat. Nos. 4,155,760, and 4,155,761. In the first named patent, a writing electrode to which a voltage of several kilovolts is applied creates a latent image in a sensitive layer coated on a conductive layer and containing a reducible metal compound, such as silver, nickel or copper salt of an organic acid; and a reducing agent. A visible image is then developed by uniformly heating at a temperature of between 80° C. and 250° C. This allows the reduction of the metal compound by the reduction agent, around the nuclei forming the latent image. In the second named patent, the metal compound generating the latent image may also be the metal compound generating the visible image (a nickel, cobalt, zinc, chromium, tin or copper compound), or be different from it (an aluminum, manganese, platinum, palladium or gold compound). In the third and fourth patents named above, a reducible coordination complex of tellurium (II) is used to generate the latent image and then the visible image. With such processes, the production of a visible image requires the use of a heating device in addition to the writing device. This increases complexity, cost, size and energy consumption of the apparatus used. In addition further processing is needed to destroy or deactivate the residual reducing agent. Otherwise a progressive discoloration of the background is experienced. Also, when the final image is not a silver one it may also be necessary to protect it from the oxidizing action of the air, for instance by coating it with a synthetic resin layer.

Another indirect process (using chemical development) is described in the U.S. Pat. No. 3,425,916. A latent image is generated, as in the previously described processes, from various metal compounds. However, the development of the visible image results from the chemical reduction, in the wet state, of a silver salt. This visible image must be stabilized by washing and fixing, as in the conventional photographic processes. In addition to the complexity of the wet processing device, it should be noted that a silver-based recording medium is very costly.

Another category of indirect processes described in the patent literature is characterized by the imagewise deposition, with writing electrodes, of electrical charges on a recording sheet coated with an insulating layer. The latent image is then developed into a visible image by electrostatic attraction of particles of a colored powder (the toner) which are eventually secured to the sheet by heating, which melts a resin contained in the toner particles. These processes, derived from xerography, contemplate a complex series of processing steps to get the final image and need a bulky device with many costly mechanical parts. Also, adding to the cost of such processes are the electrode high voltage controls and the scanning electronics required.

The second kind of process are the so-called direct processes, in which the electric current flow produces a visible image, without the need of further development. Such processes are recording devices much simpler than the indirect processes. Such devices are cheaper and can be miniaturized. A first category of direct processes are the sparking processes (also called electrothermal, or dry electrosensitive), in which the recording medium possesses a black conducting layer coated with white-greyish pigments which may be volatilized by a spark generated between a writing stylus and the black layer. This process produces nuisances for the environment, i.e., noise, fumes, odor and RF interferences. In addition, the marks have fuzzy limits is greyish and opaque, does not look like plain paper. Another paper used in direct sparking processes possesses a non-conducting black layer coated with a thin aluminum conducting layer, which is volatilized by the spark. The resolution is better with its paper but contrast is highly penalized by the metallic glossy appearance, which makes reading rather uncomfortable.

Another category of direct process is found in the electrochemical processes (also called electrolytic, electrochromic, etc.) which use electric current flow to produce an electrochemical and/or chemical reaction, generating a colored product. These processes generally use a low voltage and do not generate noise, fumes or RF interference.

An important family of electrochemical processes use a recording medium a paper impregnated with an electrolytic solution and kept wet until use or rewetted just prior to use. In use it is clamped between a writing electrode and a counter-electrode. A large number of electrochemical reactions can be used with this paper in such processes. Representative of such reactions are:

1. Cathodic reduction or anodic oxidation of a dissolved species, for instance oxidation of a colored redox indicator such as leucorosaniline, or oxidation of iodide ion into iodine, forming with starch the well-known blue complex;

2. Anodic oxidation of the writing electrode and reaction of the generated ions with a color intermediate present in the electrolyte, for instance anodic oxidation of a silver electrode and reduction into metal of the silver ions by a reducing agent such as pyrogallol or ascorbic acid, or anodic oxidation of an iron electrode and generation of a color-lake by reaction of the iron ions with pyrocatechol;

3. pH change at the vicinity of the writing electrode, triggering a color-forming reaction between colorless products, for instance a coupling reaction between a diazo compound and phenol.

It will be appreciated that this family of electrochemical processes has only a very specific range of applications. In addition to the need to keep the paper wet in a sealed bag or to rewet it, and to dry it after recording, the image resolution is very poor. The colored reaction develops between or under the effect of dissolved species which are free to diffuse, and therefore the mark tends to "bleed" out. In addition to this, the mark fades with time or the background discolors. Lastly, many of the chemicals used are irritating or even toxic and/or have an unpleasant odor.

Attempts have been made to remedy certain of the above-described drawbacks, especially the poor resolution and the need of wetting the recording medium in another family of electrochemical processes which are often more specifically called "electrochromic". Here, the electrosensitive layer contains an insoluble compound, often a metal compound, preferentially colorless, white or slightly colored. These compounds, called electrochromic compound or material are converted by anodic oxidation or, more frequently, by cathodic reduction, into a different valency, often the free metal state, where it is both colored and insoluble. The mark formed cannot bleed out by diffusion. The valency change occurs within each solid particle or crystallite brought to the suitable potential. The recording medium is generally formed by a layer of the electrochromic material particles dispersed in a binder matrix and coated on a conducting layer (aluminum, tin dioxide, carbon, etc.), itself coated on a base paper. The base paper compensates for the very low ionic conductivity of the electrosensitive layer (itself due to the low ionic conductivity of most of the electrochromic compounds) and is used as counter-electrode. The writing electrode, generally a stylus, is moved on the free surface of the electrosensitive layer. Several variants of this process are described for instance in the U.S. Pat. Nos. 3,138,547 and 4,199,413 and in the French Pat. Nos. 2,341,884, 2,398,331 and 2,435,100 which describe many electrochromic solids. Many are reducible into free metals, i.e.; $ZnO$, $PbO$, $PbCl_2$, basic $PbCO_3$, $SnO_2$, $Sn(OH)_2$, $Sn(II)oxychloride$, $Ni_2O_3$, $NiO$, $CdO$, $Bi_2O_3$, $CeO$, $V_2O_5$, $Sb_2S_5$, $H_2MoO_4$, $Wo_3$, $ZrTiO_4$, $AgO$, etc. However, some of these compounds barely react. Many are colored and/or produce a mark which is not black. For instance, $MoO_3$ is yellow and produces a blue mark; $Sn(OH)_2$ and $Sn(II)oxychloride$ are yellow and produce a black-brown mark which loses contrast if the medium is not treated with EDTA or ammonia after recording. The plain paper appearance of the recording medium, already affected by the presence of the opaque conducting layer, may also be jeopardized by the background color. It should also be noted that except for the costly silver compounds, most of the electrochromic compounds generate a mark which reoxidises in the presence of air. Associating particles of several different electrochromic compounds can only produce a juxtaposition of metal particles and not an alloy which would be more resistant to corrosion than its components.

A special kind of electrochromic process which also needs a base material sheet coated with an electronically conducting layer, uses as an electrochromic material a solution of a metal salt which is reduced and plated as free metal on the conducting layer. The conducting layer acts as a fixed cathode. In the U.S. Pat. No. 3,010,883, the electrolyte, which contains $CuSO_4$, $AgNO_3$ or $NiCl_2$, must be applied as a free solution or as a gelatinized film just prior to recording and removed just after. It can also be solidified with polyethylene glycol and coated on the cathode, but must be rewetted or melted just prior to recording. In addition to the problems created by the existence of the conducting layer and by the special glossy appearance of the plated metal marks, the recording device is very complex.

The present invention relates to a new electrochemical process and new materials for the electrical recording of visible signals, avoiding the drawbacks of the processes and materials of the prior art described hereinabove, especially of the electrochemical, electrochromic and related processes.

More specifically, one object of the invention is to provide process for recording signals and images which are directly visible, stable and permanent with high resolution and high contrast image. This is done by imagewise flowing of an electric current between at least one writing electrode and a recording medium electrically connected to at least one second electrode or counter-electrode, without the need of any additional development or fixing processing, and without the generation of sparks, fumes or odors.

Another object of the invention is to provide an electrochromic material having a high ionic conductivity, a continuous non-grannular texture and a mechanically solid consistency, which is able to be coated on a substrate or a base material as a continuous layer or film, and able, by contacting its free surface with a fixed or mobile electrode brought at a negative electric potential, to have metal ions present in the material cathodically reduced within the material at the contact point into directly visible, stable metal marks of black color, high optical density and sharp edges, without the generation of sparks, fumes or odors.

Another object of the invention is to provide a recording medium capable of permanently demonstrating, in a wide range of atmospheric humidities, the electrosensitivity necessary to record directly visible images, without the need of an activation or sensitization treatment prior to recording.

Another object of the invention is to provide a permanently electrosensitive medium able to demonstrate the surface appearance feel, color, opacity or transparency specific to the employed substrate or base material, in order to preserve the natural appearance of this substrate or a useful physical feature of it. More specifically, in case of the use as substrate of plain cellulose paper, able to preserve the surface appearance, the partial translucence, the white color and the natural feel of such paper. More specifically again, in the case of use of a transparent substrate, able to preserve this transparency in order to allow rear projection and rear observation of the recorded images.

Another object of the invention is to provide an inexpensive recording medium containing no toxic or environmentally harmful component. This medium may be manufactured by coating or impregnation, followed by drying, of a substrate or base material in the form of a sheet with a liquid or fluid mixture which is inexpensive and easy to prepare.

Another object of the present invention is to provide a recording medium for generating images whose background and marks are unaffected by light, heat and humidity.

Another object of the invention is to provide a recording process using one or more writing electrodes, more particularly shaped as styli.

These objects and others will be better understood with the following description of the invention.

SUMMARY OF THE INVENTION

The invention comprises a method of preparing electrosensitive media, which comprises; coating a substrate and then partially drying the coating until obtaining a gelled or solidified consistency, said coating comprising a homogeneous aqueous solution of:
1. An hydrosoluble salt or a hydrosoluble mixture of salts of at least one metal cathodically depositable from an aqueous solution of one of its simple or complex ions; and;
2. At least one film-forming hydrosoluble polymer resin, preferentially in the ratio of 1 part by weight of resin to 0.5 to 50 parts by weight of the anhydrous salt or salts.

The invention also comprises the media prepared by the method of the invention and its use.

DETAILED DESCRIPTION OF THE PREFERRED EMBODIMENTS OF THE INVENTION

The homogeneous layer or film applied to the substrate in the method of the invention demonstrates electrosensitivity properties of a new and unforeseen nature. It is known that the cathodic reduction of a metal ion or a mixture of metal ions dissolved in an aqueous electrolytic solution, even gelled or rigidified, generates a metal electroplate or deposit which electrocrystallises on the cathode surface to which it generally adheres. It has been found that by applying a negative electric potential to an electrode in contact with the layer free surface, the electrocrystallisation of the metal or metal alloy resulting from the cathodic reduction of metal ions present within the layer occurs within the inside of the layer with which it is integral, without adhesion to the electrode action as a cathode. The metal mark so obtained, which is not a conventional electroplate deposited on the cathode (which would be more adherent to the layer than to the cathode) is really a structure which develops within the texture itself of the layer, starting from the area of contact with the electrode. The mark generally presents an appearance close to that of a so-called "metal black" i.e., dark, mat and amorphous. It is much different from that of a conventional metal electroplate i.e., light, glossy and crystalline. When the amount of electricity flowing per unit surface area of the layer remains small, the size of the mark is limited to that of the contact area. This gives very high resolutions and seems limited only by the cross-section to which it is possible to bear the tip of the cathode. When the amount of electricity flowing per unit surface area increases, the mark broadens beyond the area of contact between the layer and the cathode. This feature clearly confirms that the electrocrystallization takes place within the layer texture. Evidence that the marks obtained are actually metal or metal alloy deposits retaining the metallic state was obtained in several fashions. For instance, with one or several ferromagnetic metal ions in the layer, the marks obtained were ferromagnetic. Conductivity of the marks was also found to be of a metallic nature.

This new kind of electrocrystallization is obtained with most of the metals which are cathodically depositable from an aqueous solution of their simple or complex ions, i.e., zinc, cadmium, lead, silver, copper, iron, cobalt, nickel, tin, indium, platinum, palladium, gold, bismuth, antimony, tellurium, manganese, thallium, selenium, gallium, arsenic, mercury, chromium and the like, associated to a large number of film-forming, hydrosoluble polymer resins. The actual crystalline structure of the metal deposit developed within the gelled or solidified layer, which seems imbricated with the network of the polymer resin, is not yet identified. It seems however that the appearance and the high optical density are indicative of a highly divided state. Although several theories may be suggested, such as a multidendritic growth along the molecular chains of the resin, the mechanism of this electrocrystallization process is not yet clearly understood, and the conditions under which it appears are not completely determined. However, it has been observed that it is generally obtained when the electrodepositable metal salts and the polymer resins are, within the specified ration limits, the sole or substantially main initially hydrosoluble components of the solidified layer. Its development is generally inhibited and replaced by an electrodeposition on the cathode and/or hydrogen evolution when the layer contains a substantial proportion of cations of metals which are not depositable from an aqueous solution, i.e., alkaline, earth-alkaline, etc. On the contrary, it is helped by the presence of ammonium ions.

It has been found, according to the invention, that it is possible to directly generate a visible metallic image in the gelled or solidified layer of the media of the invention by contacting its surface with at least one writing electrode brought at a negative potential, the layer being also connected to another electrode brought at a positive potential, so as to obtain an imagewise flow of electric current through the surface from one electrode to the other. The visible image is produced in the contact area of the layer with the writing electrode. The solidified electrolyte layer behaves in the aggregate as a solid electrochromic material and presents some analogies with the electrochromic soilds of the prior art i.e., valency change accompanied by a color change within the inside of the material. This is without any possibility of diffusion or dilution of the colored mark once the electric current is interrupted. This presents important differences. The ionic conductivity is considerably higher due to the very nature of an aqueous electrolytic solution conferring to the electrochromic material the additional property of being at the same time an electroconductive material. The structure is homogeneous and continuous. In other words not polyphasic and not grannular. This allows a higher resolution. There is also a possibility of giving to the material any suitable extended shapes, in particular a film shape. This continuous and advantageous structure, in other words without for instance the obligation existing for the prior art electrochromic materials to use it as particulate material mixed with a binder; provides the possibility of using one single metal ion reducible into metal. One can also associate ions of several metals to obtain combined or entirely new properties of the layer and of the marks.

An electrochromic material or layer according to the invention, containing the ions of one single electrode-positable metal, presents an appearance of the material and of the marks as well as properties and possible use restrictions which are specific to the metal. By associating in the electrochromic layer the ions of several metals, one can obtain by cathodic reduction an alloy which may present an appearance and/or properties combining those of the individually deposited metals. It may also present an appearance and/or properties which are completely new, especially with respect to resistance to corrosion. One can thereby develop electrochromic materials or layers displaying a set of remarkable properties which could hardly be simultaneously achieved with a single metal.

According to the invention, it has been found that if the hydrosoluble metal salt or metal salt mixture is in addition hydroscopic or preferentially deliquescent in the presence of atmospheric humidity, the electrochromic material keeps in permanence, in a range of thicknesses of the dried layer going from a few microns to several tens of microns, and down to very low atmospheric humidities, an electric conductivity high enough to make it unnecessary to place between the electrochromic layer and the substrate or base material an extra conducting layer such as, for instance, an aluminum layer or a carbon layer whose presence would not be desirable in various respects. The electrical conductivity of the electrochromic layer appears in effect high enough to allow, with the anode reasonably close to the cathode, a potential difference in the range of about 2 volts to several tens of volts to generate a current intensity suitable for useful recording speeds. An electrochromic material according to the invention which employs a hydroscopic or preferentially deliquescent metal salt or metal salt mixture therefore possesses a high permanent electrical conductivity. This permanent conductivity, which procurs a permanent electrosensitivity to the recording medium, results from the fact that with deliquescent salts the electrochromic layer keeps a sizable amount of water in equilibrium with the atmospheric humidity. This internal water, in which metal salts are dissolved in high concentration, procurs to the electrochromic layer a significant ionic conductivity which varies with the atmospheric humidity but remains high. The lower limit, which depends upon the level of hydroscopicity or deliquescence of the chosen salt mixture, is generally located in the 10% to 30% range.

It is very important to note that the needed hydroscopicity or deliquescense must be provided by the cathodically depositable metal salt or salt mixture itself. If an extra hydroscopic or deliquescent material not belonging to that category is added to the electrochromic material, it generally suppresses the formation of marks. For instance, the generation of marks is inhibited by the presence of small relative percentages of deliquescent alkali or metal salts like lithium chloride, sodium lactate, potassium acetate, magnesium chloride, calcium chloride, etc. This represents a special case of presence in the material of non-depositable cations which, as already mentioned, are detrimental to mark generation. The mark generation is also suppressed by the introduction in the material of humectants like glycerol, ethylene-glycol, or similar compounds. In both cases, the production of marks within the electrochrome material is replaced by electrode-position on the cathode and/or hydrogen evolution.

The electrochromic layer-forming aqueous solution may also contain, in addition to the hydrosoluble film-forming polymer resins and hydrosoluble cathodically reducible metal salts, some dissolved or dispersed additives to improve or modify the mechanical properties thereof. Additives to improve surface feel, glossiness or matness, color, conductivity, etc., of the electrochromic layer and to assist the preparation, storage and coating ability of the layer-forming solution may be used, representative are acids, pigments, cross-linking agents, complexing agents, wetting agents, etc. Some of these additives remain unchanged in the dried electrochromic layer while others react. For instance the polymer resin may be reactive during or after the drying process. Other additives may be partially or substantially eliminated during the drying process.

An electrochromic material according to the invention is therefore a material of solid consistency, which comprises a homogenous mixture of:
  (a) an hydrosoluble salt or a hydrosoluble mixture of salts of at least one metal cathodically depositable from an aqueous solution on one of its simple or complex ions;
  (b) a film-forming polymer resin initially hydrosoluble, preferentially in the ratio of 1 part by weight to 0.5 to 50 parts of the anhydrous salt or salts; and
  (c) water.

The electrochromic material may also contain other components such as but not limited to the following:
  1. One or several pigments or particulate solids dispersed within the electrochromic material.
  2. A cross-linking agent of the resin, interacted with the latter.
  3. Other hydrosoluble species included to improve: the stability of the material and/or of the material-forming mixture, the qualities of the marks, the conductivity and other material properties, i.e., species such as, for example, ammonium salts, complexing agents and acids.
  4. Possible residues of forming or coating agents specific to a particular method of manufacturing of the electrochromic material, such as wetting agents.

In one particular embodiment of the electrochromic material according to the invention, the material may be divided into at least two superposed or imbricated materials, each containing a different percentage of each component of the whole.

In another particular embodiment of the invention, it is possible to constitute a composite electrochromic material by superposition or imbrication of two different electrochromic materials.

The term "solid consistency" as used herein means the consistency of a material displaying, in the absence of applied external constraints, the appearance of a solid. Solid consistency includes in a non-restrictive sense the consistency of a gel or gelled medium, the consistency of a pasty medium having a very high viscosity, the consistency of a thixotropic fluid at rest, the consistency of a plastified polymer, etc.

The term "film-forming" as used herein means by definition the ability to generate a film in the system of the existing mixture, which also contains the other components of the material.

The term "initially hydrosoluble" as used herein means hydrosoluble at least before incorporation in the electrochromic material or in the material-forming mixture. However, once the electrochromic material is formed, the initial hydrosability of the resin may be lost, partially or totally, reversibly or irreversibly, (for instance by cross-linking with a cross-linking agent).

A recording medium according to the invention is composed of at least a substrate or base material and a layer of an electrochromic material able to develop by cathodic reduction metallic marks integral with the layer. Depending on the nature and texture of the substrate, the electrochromic layer is coated on the surface or impregnates the substrate partially or totally. To record images, at least one writing electrode contacts the exposed surface of the electrochromic layer. The layer is also connected, either directly or through the intermediary of one ionic conductor (or more) to at least one counter-electrode. The writing electrode used is at a negative potential with respect to the counter-electrode, in such a manner that an imagewise varying current flows from one electrode to the other through the electrochromic layer.

Many embodiments of the present invention may be considered. A set of particularly remarkable properties from the point of view of the use as a recording medium is obtained with a preferred embodiment in which the electrochromic material is constituted by a mixture of at least:

1. A hydrosoluble mixture of salts of
   (a) Zinc(II) in a proportion of 0 to 3 parts of metal by weight, and preferentially of 1 to 2 parts;
   (b) Nickel(II), in a proportion of 0.04 to 4 parts of metal by weight, and preferentially of 0.2 to 0.8 parts; and
   (c) Tin(II) in a proportion of 0.06 to 6 parts of metal by weight, and preferentially of 0.2 to 2.5 parts;
2. An initially hydrosoluble film-forming polymer resin, or mixture of such resins, in a proportion of 1 part of resin for 0.5 to 50 parts of the anhydrous salt or salt mixture by weight, and preferentially of 1 part for 3 to 20 parts; and
3. Water.

Using such a formulation, it has in effect been found that the recording layer obtained and the metallic marks developed by cathodic reduction display the following properties.

1. The layer, transparent to translucent, is nearly colorless.
2. The marks are perfectly black, mat and uniform, and have a very high optical density by reflexion as well as by rear view.
3. The marks, with sharp edges, have a surface which is homothetical to the area of contact between the cathode and the layer and which can be reduced to that area.
4. The metallic marks are remarkably stable and permanent, even in a wet and oxidizing environment.
5. The marks develop above a potential difference threshold of about 2 volts between anode and cathode.
6. The mixture is inexpensive and non-toxic.

In this preferred embodiment, a deliquescent mixture of salts of the mentioned metals is obtained by choosing the anions of these salts preferentially in the group comprising the nitrate, chloride, perchlorate, thiocyanate, and chlorate ions, and, more preferentially, in a mixture of nitrate and chloride. The ratio of the total chloride ions to the total nitrate ions may vary in all proportions, and preferentially is between 0.1 and 0.6.

Variants of this preferred embodiment, resulting in some variations in the electrochromic material properties, are obtained by replacing partially or totally Ni(II) by Co(II) or Fe(II) or by a mixture of both Co(II) and Fe(II).

An electrochromic material according to the invention is obtained according to a preferred specific method of fabrication by coating or impregnation of a substrate or base material, followed by drying until a gelled, rigidified or solidified consistency is obtained. The coating is with a fluid and more generally a liquid, homogeneous mixture, the components of which are the following.

1. A hydrosoluble salt or a hydrosoluble mixture of salts of at least one metal cathodically depositable from an aqueous solution of one of its simple or complex ions. The metal salts are salts of metals which are electrodepositable as single metals, such as zinc, cadmium, lead, silver, copper, iron, nickel, cobalt, tin, indium, platinum, palladium, gold, bismuth, antimony, tellurium, selenium, manganese, thallium, gallium, arsenic, mercury, chromium, etc., and their mixtures, as well as mixtures of some of the former with salts of metals which are not or are difficultly depositable as single metals but readily co-deposit with some of the former metals as alloys, i.e., tungsten, molybdenum, etc.

The metal salts are ionic compounds in which the metal is present as a cation or is part of a cationic complex, the anions of the compounds and other conditions, in particular pH conditions, being chosen such that the compounds are substantially completely soluble in an aqueous medium. Representative anions are chloride, nitrate, borate, fluoride, fluoborate, fluosilicate, fluogallate, dihydrogenophosphate, iodide, bromide, chlorate, perchlorate, bromate, selenate, thicyanate, thiosulfate, formate, acetate, butyrate, hexanoate, adipate, citrate, lactate, oleate, oxalate, propionate, salicylate, glycinate, glycocollate, glycerophosphate, benzoate, malate, tartrate, acetyl-acetonate, isopropylate, benzene-sulfonate, 1-phenol-4 sulfonate and the like.

The salts may also be ionic compounds in which the metal is part of an anionic outer orbital complex associated to a cation such as, for instance, the ammonium ion. Examples of such anionic complexes are chloropalladate, chloraurate, stannate and the like.

In order to prepare mixtures containing a hygroscopic (and preferentially a deliquescent salt or mixture of salts) it should be noted that most of the metals have some salts which are deliquescent or hygroscopic. They are most often halides, nitrates, perchlorates, chlorates, thiocyanates, etc.

A deliquescent mixture of salts is generally obtained with salts which are individually deliquescent, but mixtures can also be deliquescent without having all their components individually deliquescent. Such mixtures can also be more deliquescent, i.e.; crystallize at a lower atmospheric humidity than the most deliquescent of their components. For instance, zinc nitrate is deliquescent and ammonium nitrate is only slightly hygroscopic. However, it has been found that a mixture of zinc nitrate and ammonium nitrate in the range of $1NH_4NO_3 + 9Zn(NO_3)_2$ by weight to $3NH_4NO_3 + 7Zn(NO_3)_2$ by weight is substantially more deliquescent that $Zn(NO_3)_2$ alone. Such a mixture can advantageously be used to prepare a layer displaying a high ionic conductivity at relative atmospheric humidities down to very low ones.

In choosing one or several metal salts to prepare an electrochromic layer mixture, it is necessary to take into consideration possible constraints imposed by the contemplated application and by the conditions of utilization of the recording medium, i.e., cost, toxicity, appearance of the recording medium, appearance of the marks, stability of the marks, etc.

In the case where the layer contains a salt of one single electrodepositable metal, it should be noted that some metals and their salts display unwanted specific features or use limitations which can be especially noticeable because of the relatively high amount of metal salt needed, by unit surface area of the recording medium. Thus, if used to provide the sole of even the main electrodepositable metal of the layer, precious metal salts (gold, platinum, palladium, etc.) have prohibitory costs for almost all the possible applications. The cost of silver salts will drastically limit their use. The use of thallium, arsenic, mercury, lead, cadmium, tellurium, selenius may be considered as unacceptable because of direct hazards resulting from their toxicity or because of environment protection regulations. The blue color of the Cu(II) cation or the pink color of the Co(II) cation may produce a highly colored recording medium with a poor contrast and a restricted user's acceptance.

It should also be noted that with some of the metals deposited as single metals, the stability with time of the metallic mark left without protection towards atmospheric air in the wet medium where it is generated is restricted. The same happens if the layer contains an oxidizing anion like the nitrate anion. To generate a stable mark, it is preferred in such a case, to use a non-hygroscopic salt of the metal, containing a non-oxidizing anion. These two conditions will frequently be achieved in using metal salts whose anions are sulfate or borate. The electrochromic layer will then have to be formed on the substrate or base material (preferentially just prior to use) and marked before becoming completely dry, or alternatively slightly rewetted just prior to use. It will also be possible to form with hygroscopic salts of the metals an electrochromic layer displaying a permanent electrosensitivity, but the stability of the marks will be limited by time. This may find applications in displays rather than in hard-copy.

The use in the electrochromic layer of a mixture of salts of several electrodepositable metals offers much greater possibilities than the use of salts of a single electrodepositable metal. First, some metallic salts which cannot or can hardly be used alone in high concentration and/or in high amount per unit surface area of the recording medium become usable if present in low proportion with respect to other salts in a mixture where their specific limitations become acceptable or not visible. Moreover, the association of several metallic ions may allow one to obtain by cathodic reduction the co-deposition of at least two metals as an alloy whose properties can be completely different from that of the single metals.

In order to illustrate this situation with an example, the following table summarizes several features of electrochromic material and of the marks obtained in comparing the case of a material containing a metal salt mixture corresponding to the preferred embodiment hereinabove described to the case of materials containing only one single metal of this mixture. In each case, a deliquescent salt or salt mixture is used, so as to provide a permanent electrosensitivity. The weight ratio of polymer resin to anhydrous salts is about the same in each case and the marks are left unprotected from air.

TABLE 1

| Metal ions in the layer | Material background color | Relative electrosensitivities of materials | Mark appearance | Stability with time of the marks |
|---|---|---|---|---|
| Zn (II) | Colorless | ++ | Black dendritic | Disappears in a short time |
| Ni (II) | Green | + | Black | Disappears in a short time |
| Sn (II) | Colorless | + | Dark grey | Weakens to light grey |
| Zn (II) +Ni (II) +Sn (II) | Colorless with a slight greenish cast | +++ | Black, mat, uniform with sharp edges | Stable |

In the case of the preferred embodiment, the remarkable stability of the marks left in a wet medium containing oxidizing anions such as nitrate anions and simultaneously exposed to atmospheric air give some strength to the assumption that what is generated by cathodic reduction is a Zn-Ni-Sn ternary alloy. The alloy is especially resistant to corrosion, or is the inter-metallic compound NiSn whose remarkable resistance to corrosion is well known.

2. At least one film-forming hydrosoluble polymer resin.

The film-forming hydrosoluble polymer resins include resins which can dissolve in water as true aqueous solutions, and also include resins which can generate colloidal dispersions in water. Non-limitative examples of such polymers are: polyoxyethylene, polyvinylpyrrolidone, polyvinyl alcohol, cellulose ethers such as, for instance, hydroxyethylcellulose and carboxymethylcellulose, sodium alginate, polyacrylic acid and its derivatives, gelatine, gum arabic, polystyrene sulfonic acid, polyacrylamide, etc. A mixture of two or more compatible resins, i.e.; which do not co-precipitate, can be used instead of a single one.

Generally, the molecular weight of the resins is between 10,000 and 10,000,000. It has been found that the mechanical properties of the layer are often improved when the resin has a molecular weight located in the upper part of the indicated range.

It should be noted that the polymer resin, in addition to its functions in the electrochromic layer, confers to the layer-forming fluid mixture a viscosity which makes coating easier, which viscosity can be adjusted in several ways.

It has been found particularly advantageous in the present invention to use cellulose ethers, preferentially hydroxyethylcellulose and carboxymethylcellulose (for instance sodium carboxymethylcellulose of "Cellulose Gum"), preferentially of high molecular weight. With the latter, which can be readily cross-linked for instance with a polyvalent cation, the layers are especially hard and mechanically resistant and easily made tack-free.

3. Water, in sufficient amount to keep dissolved the components of the mixture, this amount being adjusted in order to have the viscosity of the liquid or fluid mixture suited to the coating technique chosen to coat the substrate or base material.

4. If needed, an acid, in sufficient amount to prevent hydrolysis and/or precipitation of the metallic species and/or gelling or syneresis or flocculation of the polymer resin in the liquid mixture and/or possibly in the formed electrochromic material.

One can use for instance hydrochloric acid, nitric acid, acetic acid, perchloric acid, chloric acid, formic acid, sulfuric acid, tartaric acid, etc. Preferentially, one shall use a volatile acid whose major part will be eliminated by evaporation during the drying of the fluid mixture layer. In effect, the amount of residual acid possibly necessary to keep the pH of the electrochromic material at a suitable value is much smaller in the electrochromic material than in the material-forming fluid mixture and may even be zero; than the use of a volatile acid or the use of a mixture of a volatile acid and of a very small amount of a non-volatile acid is acceptable to satisfy all situations.

5. If needed, a pigment or particulate solid or a combination of several pigments may be added in order to:
  (a) modify the appearance of the dried layer, naturally transparent or translucent and glossy, in order to better fit it to a special application. In particular, to make the dried layer more or less opaque and/or white and/or mat. For instance, in the case of use as a substrate of a sheet of plain cellulose paper, to give to the layer an appearance duplicating the one of the paper surface (in order to make the layer presence not visible).
  (b) suppress any surface tack of the layer.
  (c) rigidify the dried layer if the latter is pasty or lacks hardness or cohesiveness.

A large number of inorganic and organic pigments and particulate materials can be used, for instance silica, alumina, titanium dioxide, starch, polyvinyl chloride as a latex or dispersion of particles in water, calcium stearate, zinc stearate, methyl polymethacrylate, self-cross-linked acrylic polymer, etc. The chosen pigment or pigments must be compatible with the polymer resin, i.e., not produce any gelling or flocculation. According to the desired effect, the nature and surface area of the pigment, the added amount may vary within large limits, preferentially between 0.1 and 20 parts by weight of pigment for 1 part of film-forming polymer resin.

6. If needed, a polymer resin cross-linking agent, in order to improve the mechanical properties, especially hardness and cohesiveness, of the dried layer, to make the latter water-insoluble after drying and to suppress its possible surface tack. One can use the usual polymer cross-linking agents, such as polyfunctional compounds and resins. For example glyoxal, dialdehyde starch, dimethylolurea, an eopxy compound, a carbodiimide, an isoxazole, etc. can be used. One can also, in the case of resins having for instance carboxylic groups such as sodium carboxymethylcellulose, use polyvalent cations such as Zr (IV), Sn(IV), Al (III), etc. In the case of Al(III), the weight of this cation may preferentially vary between 0.01 and 0.5 parts by weight for 1 part of resin. It should be noted that with most of the cathodically reducible metal cations which are polyvalent, cross-linking will spontaneously be achieved without the need of adding an extra cross-linking agent.

The reaction conditions for the cross-linking achieved during or after drying of the electrochromic layer, and not or substantially not within the layer-forming mixture before coating. For instance, with a polyvalent cation as cross-linking agent, a low enough concentration associated with the presence of a volatile acid will prevent a substantial gelling of the fluid mixture. The increase of the polyvalent cation concentration and the evaporation of the acid during the drying process will favor the resin cross-linking in the dried layer.

It should be noted that the resin cross-linking reduces the swelling or expansion ability of the layer. This swelling ability reduction may produce, in the case of using a deliquescent salt or salt mixture, some liquid "weeping" at high atmospheric relative humidity. According to a preferred embodiment of the electrochromic layer structure for certain applications, a cross-linked, hard, rigid, non-swellable layer will be coated on a non-cross-linked, swellable underlayer which will absorb any excess liquid released by the top layer at high relative humidity.

7. If needed, agents susceptible to improve the image quality such as, for example, ammonium ions.

8. If needed, agents assisting or facilitating the manufacture and/or the storage of the liquid mixture and/or of the electrochromic material and/or the co-deposition of several depositable metal ions; agents such as, for example, complexing agents (tartaric acid, citric acid, oxalate, etc.), which may help solubilizing certain metal salts and/or prevent the premature cross-linking of the resin and/or facilitate the co-deposition of several metals into an alloy.

9. If needed, agents assisting coating or impregnation of a substrate or base material, for instance wetting agents such as water-miscible solvents (methanol, ethanol, acetone, etc.) or surface-active agents, etc., viscosity modifiers, etc.

10. If needed, all other additives susceptible to improve fabrication, layer-formation, storage stability, use and qualities of the electrochromic material forming mixture and/or of the electrochromic material.

The particular example of the preferred manufacturing process just described hereinabove also describes the composition of a preferred electrochromic material recording medium or substrate. The electrochromic material can comprise forming a homogeneous mixture of:
  1. An hydrosoluble salt or an hydrosoluble mixture of salts of at least one cathodically depositable material;
  2. A film-forming polymer resin initially hydrosoluble or a mixture of such resins;
  3. Water;
  4. Possibly one or more acids;
  5. Possibly one or more pigments or particulate solids;
  6. Possibly a resin cross-linking agent having interacted with the resin;
  7. Possibly various soluble species such as ammonium ions;
  8. Possibly complexing agents;
  9. Possibly residues of agents having facilitated coating or impregnation of a substrate or base material, in the case of a material manufacturing process comprehending the step of substrate coating with a fluid or liquid composition which is then dried; and,
  10. Possibly all additives susceptible to improve the properties and the use of the material, such as specified in the particular example of the preferred manufacturing process hereinabove described.

Obviously, if the electrochromic material is manufactured through a process different from the one hereinabove described, it may also contain residues of processing, stabilization and application agents specific to the considered process.

In order to illustrate with an example the composition of an electrochromic material and the composition of a corresponding material-forming fluid mixture to be used in the preferred particular manufacturing process, the Table 2 shows the example of an electrochromic material composition corresponding to a preferred embodiment of the invention and possessing a permanent electrosensitivity. The composition by weight of the material is determined at two different relative humidities (R. H.) after equilibrium is achieved.

TABLE 2

| Components | Material-forming fluid mixture (% by weight) | Solid Electrocrochromic material at R.H. = 36% (% by weight) | at R.H. = 70% (% by weight) |
| --- | --- | --- | --- |
| Zinc Nitrate | 4 | 19.4 | 17.3 |
| Tin (II) Chloride | 2 | 9.7 | 8.7 |
| Nickel Chloride | 1 | 5.0 | 4.3 |
| Ammonium Nitrate | 2 | 9.7 | 8.7 |
| Acetic Acid | 8 | 0 | 0 |
| L (+) Tartaric Acid | 0.1 | 0.5 | 0.4 |
| Hydroxyethylcellulose | 1 | 5.0 | 4.3 |
| Alumina powder | 8 | 38.8 | 34.6 |
| Water | 74 | 12 | 21.6 |

To make electrochromic layers according to the invention, the liquid of fluid mixture of active ingredients can be coated on a suitable substrate or base material with known coating techniques using air knife, coating bar, doctor blade, dipping, impregnation, etc. The coating must eventually be dried (with hot air, infra-red rays, exposure to the ambiant atmosphere, etc.) until they appear as dry layers or films displaying a gelled, rigidified or solid consistency.

In order to make the electrochromic coating or layer, the liquid or fluid mixtures can be coated in one single layer or in several superimposed layers, each layer being dried before coating the next one. Alternatively all the layers may be simultaneously dried. The various layers may be identical. They may also contain a different percentage of each component. Each layer may also have a different composition which allows one to adjust the whole layer system to the desired application. For instance, in the preferred embodiment of the electrochromic layer structure mentioned above the top layer (or layers) can be made with a polyvalent cation cross-linkable resin such as sodium carbomethylcellulose and the underlayer (or underlayers) with a resin such as hydroxyethylcellulose. The cross-linked upper layer(s) will display a good mechanical resistance to abrasion by the writing electrode, whereas the swellable underlayer(s) will allow the whole layer system to respond to atmospheric relative humidity variations. It is also possible, instead of making continuous layers with the electrochromic material, to divide it into particles and constitute a layer by juxtaposition of such particles embedded for instance in a binder matrix.

The liquid or fluid coating mixtures can be directly coated onto the final substrate or base material. They can also be coated on a provisional or intermediate substrate and later transferred onto a final substrate. In this case, it may be advantageous to have a tacky top layer and a non-tacky underlayer, to facilitate transfer and adhesion to the final substrate.

Although unnecessary for most applications, it is obviously possible to interpose between the substrate or base material and the electrochromic layer an extra layer possessing a high ionic or electronic conductivity. For instance, a conducting polymer layer, a metal layer (aluminum, nickel, etc.), a semi-conducting layer (tin dioxide, indium oxide, etc.) or a carbon layer. The presence of such a layer, which also acts as the counter-electrode if its conductivity is of electronic nature, can be useful if one wants to print simultaneously a large area. For instance if one wants to print at the same time one or several lines of characters or even a full page with a suitable set of electrodes. With a high conductivity layer, the current lines will be of equal length through the electrochromic layer, ensuring a uniform print density.

To make recording media according to the invention, it is possible to use as substrate or base material a great variety of materials, especially as thin sheets. For instance cellulose papers, cardboards and bristol-boards, mixed cellulose and polyamide synthetic papers ("Marinil" and "Marilon" from "Arjomari-Prioux"), polyamide or polyethylene synthetic paper ("Tyvek", "Polyart", "Yupo", etc.) ethylene glycol polyterephtalate films ("Mylar", "Terphane", etc.), polycarbonate films ("Pokalon", etc.), cellulose acetate films, polyethylene films, polyvinyl chloride films, etc., paper-plastic laminates (such as cellulose paper-polyethylene film laminates), aluminum-paper laminates, aluminum-paper-plastic triple laminates, papers coated with an impervious layer, such as cellulose papers coated with polyvinylidene chloride, cellulose and synthetic fabrics and non-wovens, glass, ceramics, porcelain and the like.

According to the nature of the substrate or base material, the properties of the electrochromic material coated substrate are different; two cases are to be considered:

1. Porous substrates made from a humidity absorbing material (for instance: cellulose papers, etc.). After impregnation and drying, the layer retained in the paper porosity contains a certain amount of residual water in equilibrium with the atmospheric humidity if the material is made with a deliquescent salt or deliquescent salt mixture. The layer releases more or less rapidly a significant amount of its residual water to the paper which absorbs it by capillarity. The conductivity and therefore the electrosensitivity of the electrochromic layer decreases with time. It is of course possible to impregnate the paper with an amount of electrochromic material such that the loss of electrosensitivity is negligible in spite of the absorption of liquid by the paper, but the paper may soften at high relative humidity. It is therefore preferable to impregnate the paper with an amount of electrochromic material small enough to avoid softening of the paper, and to record images soon after impregnation and drying.

In the case of an electrochromic material constituted with a non-hydroscopic salt or salt mixture, there is no softening of the paper at high relative humidity. Drying can eliminate all the internal water, strongly reducing the electrosensitivity. In order to allow printing, the drying must be interrupted to leave a certain amount of water, and recording must proceed before complete spontaneous drying.

2. Porous and non-porous substrates made from a humidity non-absorbing material, and humidity-absorbing porous substrates impregnated with an impermeabilization material in their entire thickness, in a fraction of the entire thickness, or on surface. For instance, plastic films (polyester, polycarbonate, polyethylene, etc.), synthetic paper (polyamide fiber paper, polyethylene fiber paper, etc.), cellulose papers impreganted with an impermeabilization resin, cellulose papers coated with an impervious layer of polyvinylidene chloride, cellulose paper-polyethylene film laminates, synthetic nonwovens (polyamide, polyester, polypropylene, polyacrylonitrile, polyvinylchloride and their co-polymers, etc. and the like. Such substrates either don't absorb humidity or at least possess one impervious face which protects the rest of the substrate from a possible absorption. By coating or impregnating the substrate in such a way that the electrochromic material does not come into contact with the water-absorbing part of the substrate i.e.; for example, by coating the free face of the plastic film of a cellulose paper-plastic film laminate, the electrochromic layer thus obtained, (if made with a deliquescent salt or deliquescent salt mixture) will never lose the residual amount of water in equilibrium with the atmospheric humidity. The substrate so impregnated or coated will therefore constitute a recording medium possessing a permanent electrical conductivity, i.e.; a permanent electrosensivity.

The thickness of the "dry" layers can vary within broad limits. For most applications, a total layer thickness ranging between 5 and 20 microns is generally used but it is possible to go beyond these limits.

With the substrates belonging to the second group, it is possible to manufacture, among others, two especially interesting categories of recording media having a permanent electrosensitivity. They are as follows:

(a) With a substrate such as a cellulose-paper-plastic film laminate (for instance a 90 g/m$^2$ paper - 15 g/m$^2$ polyethylene laminate) coated on its plastic film free face with an electrochromic layer containing a suitable pigment, it is possible to obtain a permanently electrosensitive recording sheet presenting on both faces the surface appearance, feel and white color as well as the natural translucence of the paper used in the laminate. The presence of the plastic film and of the electrochromic layer is not distinguishable. One can thus produce a recording medium presenting the appearance of plain paper.

(b) With a substrate such as a transparent or translucent plastic film (for instance a polyester or polycarbonate or frosted film), one can produce a translucent to quasi-transparent colorless recording medium, able to record marks observable by rear view or projection.

In the case of the substrate or base materials belonging to the second group (b) such as plastic films, it may be useful, in order to improve the adhesion of the electrochromic layer, to apply to the surfaces to be coated known anchoring treatments (flame treatment, corona treatment, anchoring layer coating, etc.).

The printing of marks on recording media according to the invention can be done in several ways. One can for instance use a stylus-shaped writing electrode, for instance, a spring-loaded metal wire having a cross-section of a ten to several tens microns. The tip may be applied with a suitable pressure to the free surface of the recording medium and may be moved with a regular sliding friction. Such a stylus scans the surface, for instance with a line-scanning movement, whereas an imagewise electric current flows between the electrochromic medium and the tip of the stylus brought to a negative potential (acting as a cathode), printing one dot after another.

One can also use instead of a single stylus, an array of several writing styli, for instance arranged in a row or in a column, or in a rectangular dot matrix, allowing one to print one at a time a line of dots or an entire alphanumerical character.

Another kind of stylus-shaped writing electrode especially useful if the recording sheet is moving on a cylindrical drum, is a flat stylus contacting tangentially the sheet. The point of contact is displaced along the sheet when the drum is rotating and/or the stylus is moving. Such a flat stylus, which can be for instance a thin layer of metal deposited onto a flat substrate and properly shaped, is especially well suited to the easy and inexpensive manufacture of large arrays of styli, especially arrays able to print an entire line of dots one at a time. Printed circuit techniques can for instance be used to generate a dense array of fine parallel styli as well as their electrical connections to the driving electronics.

One can also use one or several writing electrodes fixed, i.e.; not moving with respect to the recording medium. Either fixed just at the moment of printing, or permanently fixed. In the first case, an electrode or a group of electrodes may skip between two printing positions and remain in fixed contact with the recording medium during the time needed to print a mark. A plurality of writing electrodes may also be part of a cylindrical head rotating without sliding on the recording sheet. When the head rotates, each electrode comes temporarily into contact with the recording medium without sliding or impact. In the second case, the writing electrodes constitute a fixed array which can be contacting progressively or as a whole the recording medium. A stencil whose characters are metallized to be conducting is an example of such a fixed array.

In the case of the fixed electrodes, it should be noted that they can for instance be stylus-shaped as in the case of sliding electrodes. They therefore allow dot matrix printing, but without the inconveniencies of sliding movement (abrasion, debris build-up, etc.). But they can also be given complex and superficially extended shapes, leading to a large contact area with the recording medium. For instance, they can be given typographical character shapes which will thus be printed at one time as smooth continuous characters. The recording process according to the invention is thus suited for dot printing and dot matrix printing, but is also suited for printing in one time of typographical characters or other continuous marks or images of large area, as practiced in conventional printing and duplication processes.

A very large number of materials can be used to make writing electrodes. For instance, gold, silver, platinum and the other platinum family metals, molybdenum, tungsten, nickel, steel, graphite, aluminum, chromium, etc. Their operation as cathodes procures them electrochemical protection against corrosion.

In order to record, one must associate with the writing electrode at least one second electrode or counterelectrode which is also in contact with the electrochromic material of the recording medium. To print marks, the wirting electrode is brought at a negative potential with respect to the counter-electrode, and an electrical current flows from one to the other across the electrochromic material. The counter-electrode can be put into contact with the surface of the electrochromic layer at a distance from the writing electrode. In general, the smaller the gap, the lower the voltage necessary to print marks. In the case of a porous sheet impregnated with electrochromic material throughout its entire thickness, one can also put the counter-electrode in contact with the back of the sheet, opposite to the writing electrode. When possible, such an arrangement minimizes the necessary writing voltage. The counter-electrode can be shaped such as to fit the shape of the recording medium surface. It can also be cylindrical in order to roll on the recording medium surface. One may use one single counter-electrode or several distinct ones arranged so as to improve the current lines distribution and minimize the writing voltage. The special case where the counter-electerode is a layer interposed between the electrochromic layer and the substrate or base material has already been mentioned. In general, it is recommend to make the contact area between the counter-electrode(s) and the electrochromic material the largest possible.

During recording, the counter-electrode operates as an anode. The anodic oxidation which takes place must not affect the counter-electrode itself, otherwise it would corrode. The material constituting the counter-electrode must therefore be properly chosen. In general, suitable materials are graphite, semi-conducting oxides (tine dioxide, lead dioxide, indium oxide), nickel, some stainless steels, platinum and the other platinum family metals, gold tantalum, titanium, etc. Anodic oxidation must also not generate by-products which could be detrimental to the environment or colored by-products producing parasitic marks. For instance, chloride ions, if present, must not be oxidized into gaseous chlorine whose odor would be unpleasant or even irritating. A suitable choice of the counter-electrode material with respect to the electrochromic material composition will generally allow one to selectively and preferentially oxidize a component whose oxidation product does no harm at all. For instance, it will most generally be possible to preferentially oxidize water or a water ion into oxygen. If it is not possible to avoid unwanted oxidation by-products in the case of direct contact between the counter-electrode and the electrochromic material, it will always be possible to avoid it by interposing between the electrochromic material and the counter-electrode an extra ionic conductor chosen so as to contain no species able to facilitate oxidation of the counter-electrode and no species able to be oxidized into a harmful by-product. For instance, such an ionic conductor will be chosen as to contain as the single oxidizable material water or a water-ion. A suitable ionic conductor of this kind may for instance be a second electrochromic material according to the present invention, but containing no oxidizable or depassivating anion. This second electrochromic material may be coated in superposition with or next to the main electrochromic layer in order to constitute one or several lateral stripes exterior to the area to be printed. Another suitable extra ionic conductor may be an ion-exchange membrane, a porous sheet impregnated with an electrolyte, or the like.

Depending upon conditions, the writing voltage generally ranges between about 2 volts and several tens of volts. The current, which depends among other things on the size of the contact area between the writing electrode and the surface of the recording medium, generally ranges between a fraction of a microampere and several milliamperes for a stylus-shaped electrode, and beyond for a large area electrode.

A signal and image recording device using the recording process and media according to the invention comprehends at least a d.c. power supply, one or more writing electrodes operating as cathodes, one or more counter-electrodes operating as anodes and means to bring the writing electrodes and the counter-electrodes. The latter possibly through the intermediary of an auxilary ionic conductor, in contact with the free surface of the recording medium. Also required is a means for moving the recording medium and/or the electrodes in order to scan the totality of the area to be printed with the writing electrodes and means to imagewise modulate the electric current flowing between the writing electrodes and the recording medium.

EXAMPLES

The following examples of the invention are presented and represent the best mode contemplated by the invention. It should be noted, however, that these examples are illustrative only and they do not intend to limit the scope of the present invention.

EXAMPLE 1

The following liquid mixture is prepared:

| | |
|---|---|
| zinc (11) nitrate | 6 parts by weight |
| stannous chloride: | 3 parts by weight |
| nickel (11) chloride: | 1 parts by weight |
| L (+) tartaric acid: | 0.2 parts by weight |
| hydrochloric acid: | 0.3 parts by weight |
| sodium carboxymethyl-cellulose "7 HOF" from "Hercules": | 1 parts by weight |
| silica "Aerosil 200": from "Degussa": | 2 parts by weight |
| water: q.s. | 100 parts by weight |

The first five components are dissolved in one half of the total water. To this solution there is added a solution of the carboxymethylcellulose in the other half of the total water. The mixture is stirred until complete homogeneity is obtained. The silica powder is then dispersed in the homogeneous solution.

The liquid mixture obtained has a pH of 3.5 and displays a viscosity suitable for application with a coating bar. Several layers are coated on the plastic side of a 90 $g/m^2$ Kraft paper - 25 $g/m^2$ polyethylene laminate, and dried with warm air until a total thickness of the dry film ranging between 10 and 20 microns is obtained. The coated film is mechanically solid and rather hard; its surface has a mat and white appearance reproducing the surface appearance and feel of plain cellulose paper. Marks are produced by flowing an electric current between a negatively polarized writing electrode made from a molybdenum wire having a diameter of 0.1 mm whose tip is in contact with the coating surface and a counter-electrode made from a nickel plate also in contact with the coating surface, several millimeters apart from the writing electrode. The voltage is varied between 2 volts and 110 volts. The corresponding current, which depends upon the voltage upon the relative humidity and the anode-cathode distance, varies between a fraction of a microampere and several milliamperes. The marks obtained are perfectly black with uniform density and with well-defined sharp edges. The appearance is comparable to the appearance of a mark made with India ink. If the writing electrode is fixed, the mark is a dot whose diameter broadens with time when current is flowing. If the writing electrode moves, the mark is a line with parallel sharp edges whose width depends upon current intensity and speed. The mark printing is noiseless, odorless and proceeds without sparks or fumes. The recorded marks are stable over a period of time and the electrosensitivity of the recording paper remains permanent. The paper background does not discolor with time.

Repeating the above general procedure with the same liquid mixture, a "Mylar" polyester film and a glass plate are coated. In both cases, after drying, the coated substrates are translucent (nearly transparent) and nearly colorless. Under rear view, the marks appear opaque and can be projected. Here too, the marks are stable with time and the electrosensitivity is permanent.

Repeating the above general procedure with the same liquid mixture, a plain cellulose paper sheet of the type used in offset printing is coated. The recording of marks soon after coating and drying is similar to the preceding cases; but the electrosensitivity progressively decreases with time and is strongly reduced after several hours.

EXAMPLE 2

The following liquid mixture is prepared:

| | |
|---|---|
| zinc nitrate: | 6 parts by weight |
| stannous chloride: | 4 parts by weight |
| nickel chloride: | 1 parts by weight |
| aluminum (111) chloride: | 0.5 parts by weight |
| L (+) tartaric acid: | 0.2 parts by weight |
| acetic acid: | 8 parts by weight |
| sodium carboxymethylcellulose "7 HOF" from "Herceules" | 1 parts by weight |
| silica "Gasil 23D" from "Crossfield": | 1 parts by weight |
| polyvinylchloride latex "Geon" from "Goodrich" (solids): | 1 parts by weight |
| water q.s. | 100 parts by weight |

The general procedure of Example 1 supra., is repeated, except that the liquid mixture as used therein is replaced with the liquid mixture of this Example 2. The two solid pigments are dispersed one after the other. After coating and drying, the appearance of the layer is very close to the one of Example 1, but the surface mattness is greater, especially under tangential observation of the layer. The appearance and the stability with time of the recorded marks and the electrosensitivity noted are similar to Example 1.

EXAMPLE 3

The following aqueous solution is prepared.

| | |
|---|---|
| zinc nitrate: | 4 parts by weight |
| stannous chloride: | 2 parts by weight |
| nickel chloride: | 1 parts by weight |
| ammonium nitrate: | 2 parts by weight |
| aluminum nitrate: | 0.8 parts by weight |
| L (+) tartaric acid: | 0.1 parts by weight |
| acetic acid: | 8 parts by weight |
| sodium carboxymethylcellulose "7 HOF" from "Hercules": | 1 parts by weight |
| water: q.s. | 100 parts by weight |

The preparation process followed is similar to the one described in Example 1 except that there is no dispersion of a particulate material. Therefore the film forming liquid mixture reduces to a homogeneous aqueous solution viscous enough to be coated with a coating bar. After coating and drying, the appearance of the dried layer presents two differences from the layer of Example 1. The surface is glossy and the overall transparency of coated transparent substrates is higher. The appearance and the stability with time of the recorded marks and the electrosensitivity are similar.

EXAMPLE 4

The following fluid mixture of a creamy consistency is prepared:

| | |
|---|---|
| zinc nitrate: | 6 parts by weight |
| stannous chloride: | 3 parts by weight |
| nickel chloride: | 1 parts by weight |
| aluminum chloride: | 0.5 parts by weight |
| L (+) tartaric acid: | 0.1 parts by weight |
| acetic acid: | 8 parts by weight |
| hydroxyethylcellulose "Natrosol 250 HHXR" from "Hercules": | 1 parts by weight |
| alumina "C" from "Degussa": | 8 parts by weight |
| water: q.s. | 100 parts by weight |

The preparation procedure of Example 1 is repeated except that the liquid mixture as used therein is replaced with the mixture of this Example 4. Also the first six components are dissolved in one half of the total water. To this solution there is added a solution of the hydroxyethylcellulose in the other half of the total water and the mixture is stirred until complete homogeneity is obtained. The alumina powder is then dispersed in the homogeneous solution. The fluid mixture of creamy consistency thus obtained is coated and dried. The dried film is less hard and has a more slippery feel than in Example 1 and the surface is semi-glossy. The adhesion to the substrates is higher. Coated plain cellulose paper and paper-polyethylene laminate are whiter. The appearance and the stability with time of the recorded marks, the lack of background's discoloration with time and the electrosensitivity are similar to the product of Example 1.

EXAMPLE 5

The following fluid mixture of a creamy consistency is prepared:

| | |
|---|---|
| zinc nitrate: | 8 parts by weight |
| stannous chloride: | 1.7 parts by weight |
| nickel chloride: | 1 parts by weight |
| ammonium nitrate: | 4 parts by weight |
| acetic acid: | 6 parts by weight |
| polyvinyl alcohol "Poval 224" from "Kuraray": | 2 parts by weight |
| alumina "C" from "Degussa" | 16 parts by weight |
| water: q.s. | 100 parts by weight |

The procedure of Example 1 is repeated except that the liquid mixture as used therein is replaced with the mixture of this Example 6. The appearance and properties of the coated substrates and of the marks and the electrosensitivity are similar to those found in Example 4.

EXAMPLE 6

The following liquid mixture is prepared:

| | |
|---|---|
| zinc nitrate: | 8 parts by weight |
| stannous chloride: | 1.7 parts by weight |
| nickel chloride: | 1 parts by weight |
| ammonium nitrate: | 4 parts by weight |
| acetic acid: | 6 parts by weight |
| polyvinylpyrrolidone "K 90" from "GAF Corporation": | 2 parts by weight |
| alumina "C" from "Degussa": | 8 parts by weight |

-continued

| | |
|---|---|
| water: q.s. | 100 parts by weight |

The procedure of Example 1 is repeated except that the liquid mixture as used therein is replaced with the mixture of this Example 6. The appearance and properties of the coated substrates and of the marks and the electrosensitivity are similar to those found in Example 4.

EXAMPLE 7

The following fluid mixture of a creamy consistency is prepared:

| | |
|---|---|
| zinc nitrate | 4 parts by weight |
| ammonium nitrate: | 2 parts by weight |
| acetic acid: | 1.13 parts by weight |
| hydroxethylcellulose "Natrosol 250 HHXR" from "Hercules": | 1.5 parts by weight |
| alumina "C" from "Degussa": | 12 parts by weight |
| water: q.s. | 100 parts by weight |

The procedure of Example 1 is repeated except that the liquid mixture as used therein is replaced with the mixture of this Example 7. After coating and drying, the coated film, more flexible and less hard than found in Example 4, has the same feel, gloss and adhesion to the substrate found in Example 4. The appearance of the recorded marks and the electrosensitivity are similar. However, the stability over time of the recorded marks is limited. The marks fade with time and eventually disappear. In the case of the substrates having permanent electrosensitivity, it is possible to reuse the same recording medium a considerable number of times to record an image whose conservation needs only to be temporary.

EXAMPLE 8

On the substrates described in Example 1, several layers of the fluid mixture of Example 7 are coated and dried with warm air until a dry film of total thickness ranging between 5 and 10 microns is obtained. On this film as an underlayer, several layers of the liquid mixture of Example 1 are then coated and dried with warm air until a dry film of total thickness ranging between 5 and 10 microns is obtained, i.e. a total thickness of the composite film ranging between 10 and 20 microns.

The composite film thus obtained displays an interesting combination of the properties of the films of which it is composed. The surface appearance and feel, the mattness, the hardness and the stability with time of the marks are those of the films of Example 1. The adhesion to the substrates is the one of the films of Example 7. Moreover when using the substrates allowing a permanent electrosensitivity to be kert, the coating surface keeps its hardness and cohesiveness and shows no liquid weeping when the atmospheric relative humidity becomes very high. Under the same circumstances, the films of Example 1 alone may show some weeping and the films of Example 7 alone, soften.

EXAMPLE 9

A non-woven polyester fabric of 30 microns thickness is impregnated with the liquid mixture of Example 1. After wringing between rollers and drying, the process is repated several times until the void volume of the non-woven is completly filled with electrochromic material. The whitish translucent sheet thus obtained is placed on a nickel plate used as an anode. Dots and lines are recorded on the upper face of the sheet by flowing an electric current between the anode and a writing cathode (a molybdenum wire having a diameter of 0.1 mm whose tip is in contact with the upper surface). One can also produce in one time, broad black areas by pressing against the sheet surface a plane cathode having the shape of the black area to produce. One can also print in the same way, in one time, typographical characters by pressing against the surface cathodes constituted by typewriter metal types. After having printed marks on one side of the sheet, the latter is turned upside down and one can print the same way on the other side, without erasing the first marks.

EXAMPLE 10

The following aqueous solution is prepared:

| | |
|---|---|
| zinc nitrate: | 0.7 parts by weight |
| ammonium nitrate: | 0.3 parts by weight |
| hydrochloric acid: | 0.1 parts by weight |
| sodium carboxymethylcellulose "7 HOF" from "Hercules": | 1 parts by weight |
| water: q.s. | 100 parts by weight |

After coating this solution on a polyester sheet and drying, one obtains a colorless and transparent recording sheet whose electrosensitivity is appreciably smaller than found in Example 7 and which records slightly dendritic black marks.

EXAMPLE 11

The following acqueous solution is prepared:

| | |
|---|---|
| zinc nitrate: | 48 parts by weight |
| aluminum chloride | 0.5 parts by weight |
| hydrochloric acid: | 0.1 parts by weight |
| sodium carboxymethylcellulose "7 HOF" from "Hercules": | 1 parts by weight |
| water: q.s. | 100 parts by weight |

After coating this solution on a polyester sheet and drying, the dried film is rather soft and displays a very high electrosensitivity. The recorded marks are grey and dendritic.

EXAMPLE 12

The following four acqueous solutions A, B, C, D are prepared:

| | parts by weight | | | |
|---|---|---|---|---|
| | A | B | C | D |
| zinc nitrate | 6 | 6 | 6 | 6 |
| stannous chloride: | 3 | 3 | 3 | 3 |
| nickel chloride: | 1 | 1 | 1 | 1 |
| aluminum chloride: | 0.5 | 1.5 | 0.5 | 0.5 |
| magnesium chloride: | 0 | 0 | 1 | 0 |
| lithium chloride: | 0 | 0 | 0 | 1 |
| acetic acid: | 8 | 8 | 8 | 8 |
| L (+) tartaric acid: | 0.2 | 0.2 | 0.2 | 0.2 |
| hydroxyethylcellulose "Natrosol 250 HHXR" from "Hercules" | 1 | 1 | 1 | 1 |
| water: q.s. | 100 | 100 | 100 | 100 |

After coating these solutions on a polyester sheet and drying, one obtains 4 transparent, nearly colorless films which behave in the following way with respect to the recording of marks:

A: record marks with a mark appearance and stability with time and with an electrosensitivity similar to those obtained with the mixtures from Examples 1 to 6.

B: very faint marks recorded.

C: no marks recorded.

D: no marks recorded.

One can see that marks are hardly or not recorded if, in a mixture like A, one increases the content of or introduces non-electrodepositable cations such as aluminum (III), magnesium (II) or lithium (I) up to relative percentages (which are still small).

EXAMPLE 13

The following aqueous solution is prepared:

| | |
|---|---|
| stannous chloride: | 5 parts by weight |
| acetic acid: | 8 parts by weight |
| L (+) tartaric acid: | 0.2 parts by weight |
| sodium carboxymethylcellulose "7 HOF" from "Hercules" | 1 parts by weight |
| water: q.s. | 100 parts by weight |

After coating this solution on a polyester sheet and drying, one obtains a transparent, colorless film whose electrosensitivity is appreciably smaller than in Example 1. The recorded marks, uniform and with sharp edges are dark grey. After a certain time, the marks fade to a light grey residue.

EXAMPLE 14

The following three aqueous solutions are prepared:

| | parts by weight | | |
|---|---|---|---|
| | A | B | C |
| zinc nitrate: | 6 | 6 | 6 |
| stannous chloride: | 3 | 3 | 3 |
| nickel chloride: | 1 | 0 | 0 |
| cobalt (II) chloride: | 0 | 1 | 0 |
| iron (II) chloride: | 0 | 0 | 2 |
| aluminum chloride: | 0.25 | 0.25 | 0.25 |
| hydrochloric acid: | 0.3 | 0.3 | 0.3 |
| L (+) tartaric acid: | 0.2 | 0.2 | 0.2 |
| sodium carboxymethylcellulose "7 HOF" from "Hercules": | 1 | 1 | 1 |
| water: q.s. | 100 | 100 | 100 |

After coating these solutions on polyester sheets and drying, one obtains 3 transparent glossy films recording black marks of uniform density with sharp edges and displaying a permanent electrosensitivity. The following slight differences can be seen:

A: nearly colorless; the marks are stable with time.

B: slightly pink; the marks are stable with time.

C: colorless; the marks become brownish with time.

What is claimed is:

1. A process of manufacture of electrochromic material which comprises; coating onto a substrate or base material or impregnating it and then drying, a fluid, homogeneous mixture of
   (a) water;
   (b) a hydrosoluble salt or hydrosoluble mixture of salts of a metal cathodically depositable from an aqueous solution of its ions; and
   (c) an initially hydrosoluble film-forming polymer resin.

2. A process of manufacture according to claim 1, wherein the fluid mixture contains a volatile acid.

3. The process of claim 1, wherein the mixture also contains a particulate solid.

4. The process of claim 1, wherein the mixture also contains a resin cross-linking agent.

5. The process of claim 1, wherein the mixture also contains a complexing agent.

6. The process of claim 1, wherein the mixture also contains ammonium ions.

7. The process of claim 1, wherein the mixture also contains agents for improving the coating step.

8. A process of manufacture according to any one of the claims 1 and 2, wherein the fluid mixture contains wetting agents.

* * * * *